United States Patent [19]
Weber et al.

[11] Patent Number: 5,249,763
[45] Date of Patent: Oct. 5, 1993

[54] MOUNTING SYSTEM FOR LOW PROFILE WATER DISTILLER

[75] Inventors: Thomas J. Weber, Oak Creek; William R. McCormick, Kenosha, both of Wis.; Dale L. Garrison, Antioch, Ill.

[73] Assignee: Emerson Electric Co., Racine, Wis.

[21] Appl. No.: 945,517

[22] Filed: Sep. 16, 1992

[51] Int. Cl.⁵ .............................................. E12B 9/00
[52] U.S. Cl. ................... 248/27.1; 248/220.2
[58] Field of Search ................. 248/242, 244, 27.1, 248/201, 220.1; 108/108, 106; 202/185.3

[56] References Cited

U.S. PATENT DOCUMENTS

| | | | |
|---|---|---|---|
| 4,260,208 | 4/1981 | Lun Ho et al. | |
| 4,333,588 | 6/1982 | Schreck et al. | |
| 4,577,092 | 3/1986 | Lenoir | 248/242 X |
| 4,580,754 | 4/1986 | Hughes | 248/201 X |
| 4,582,290 | 4/1986 | Baron | 248/201 X |
| 4,739,781 | 4/1988 | Casoli | |
| 5,104,071 | 4/1992 | Kowalski | 248/27.1 |
| 5,110,419 | 5/1992 | Weber et al. | 202/234 X |

FOREIGN PATENT DOCUMENTS 0105727  3/1965  Norway ............... 248/242

Primary Examiner—Ramon O. Ramirez
Attorney, Agent, or Firm—Ryan, Kees & Hohenfeldt

[57] ABSTRACT

An adjustable mounting system for mounting an article such as a low profile water distiller in kitchen cabinets or similar spaces of widely varying dimensions. The system includes support arms received in telescoping relationship in channels located on the article, which are affixed at their ends, that may be angled downwardly, to a horizontal cross member that is mountable on a rear mounting bracket. The mounting bracket has a plurality of vertically displaced notches for receiving and supporting the horizontal member. Alternatively, the bracket may be provided with an indentation at the top of each flange of the bracket. In this embodiment vertical adjustment is by means of holes in the arms at different vertical displacements. The distiller is provided with a horizontal channel adapted to telescopingly receive the arms. A forward bracket is provided to adjustably support the forward end. The forward bracket preferably includes two L-shaped bracket arms connected to the forward sidewalls of the supported article which bracket arms have ends telescopingly receiving a cross member that supports the front of the article. The cross member is provided with upwardly extending pins that are received in apertures in the bottom surface of the article.

11 Claims, 3 Drawing Sheets

Fig. 1

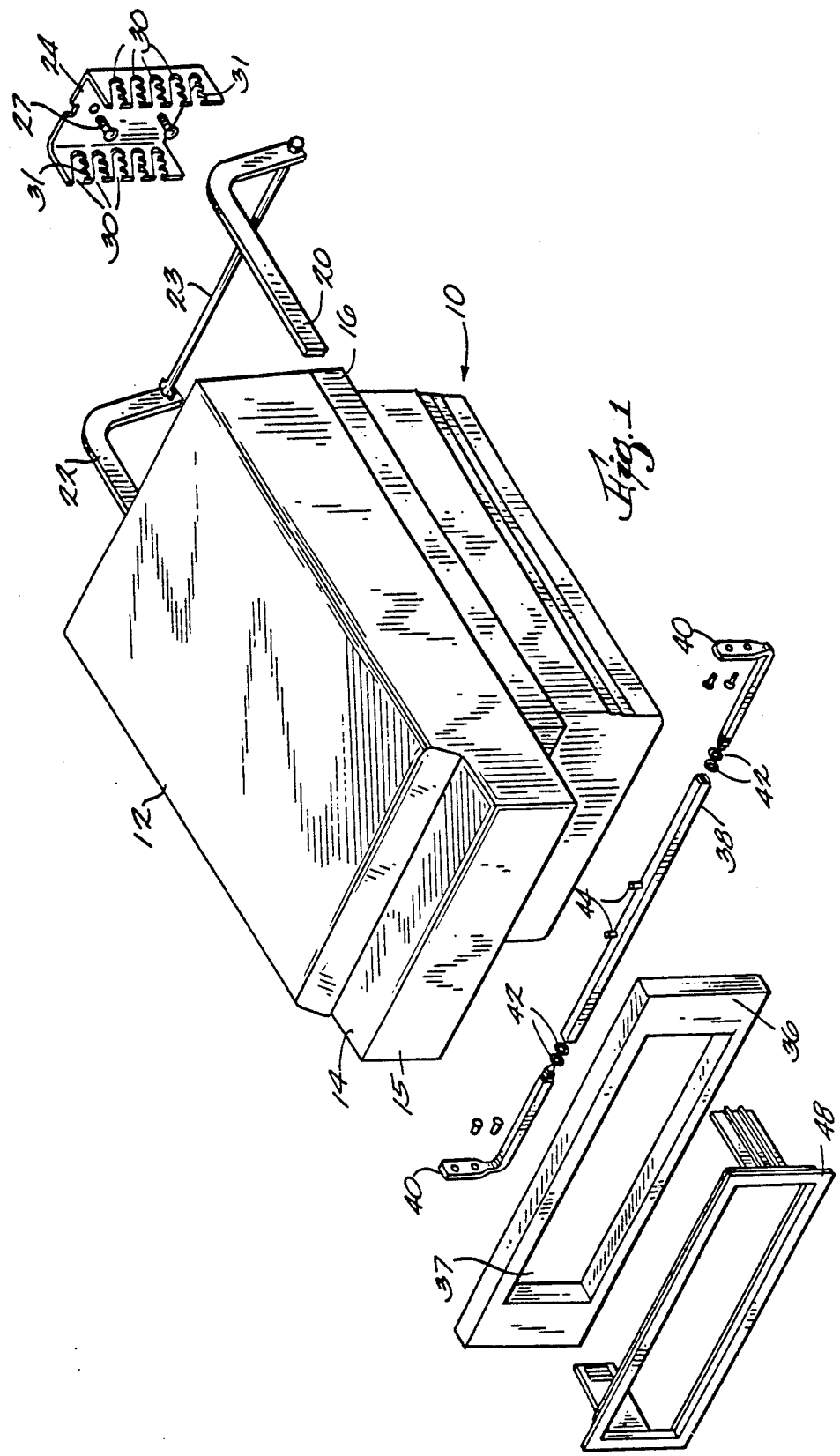

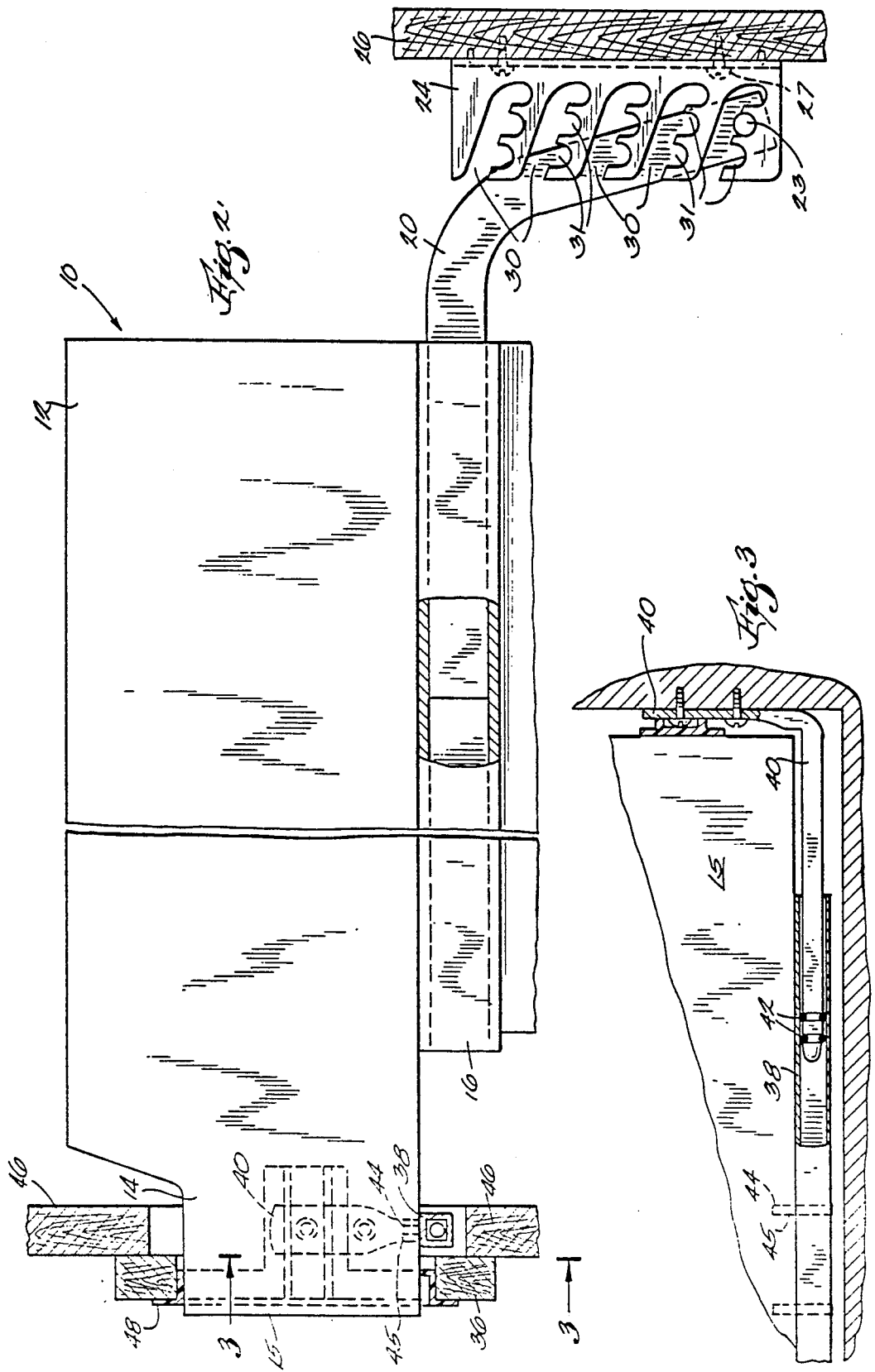

MOUNTING SYSTEM FOR LOW PROFILE WATER DISTILLER

FIELD OF THE INVENTION

The present invention relates to apparatus for mounting a low profile water distillation unit in a cabinet such as a kitchen cabinet drawer.

BACKGROUND OF THE INVENTION

Low profile water distillers adapted to be fitted in cabinetry such as a drawer in a kitchen area are described in U.S. Pat. No. 5,110,419 issued May 5, 1992. In order to function properly it is important that such units be positioned in a level horizontal orientation in the cabinet in which the unit is mounted. Available mounting systems have required large numbers of separate hardware pieces to accommodate mounting of such units in drawers of varying dimensions. A time consuming process has also been required in order to level the units particularly from front to back.

SUMMARY OF THE INVENTION

In accordance with the present invention, a system is provided that enables the use of the same hardware for a variety of drawer or cabinet dimensions. A further advantage of the hardware provided by the present invention is the ability to readjust the orientation of the unit after installation if needed, without removal of the mounting system. Various other objects and advantages will be apparent from the detailed description herein. Briefly summarized, the invention provides an adjustable mounting system for mounting an article such as a low profile water distiller in spaces having front and rear walls, such as kitchen cabinets, so that the same mounting system is usable in spaces of widely varying dimensions. The system includes at least one, and preferably two, support arms received in telescoping relationship in channels located on the article. The support arms are affixed at their distal ends to a horizontal member that is mountable on a rear mounting bracket secured to the rear wall of the cabinet or similar space. The rear bracket has a plurality of vertically displaced means such as slots for receiving and supporting the horizontal member. The distiller or similarly shaped device is provided with a horizontal channel oriented in a front to rear direction adapted to telescopingly receive the arms. Preferably the support arms are downwardly angled toward their rear, distal ends so that the horizontal member is disposed below the telescoping arms. A forward bracket having an opening for access to the front of said article is provided to adjustably support the forward end of the article.

Preferably one support arm is affixed to each end of said horizontal member, each of said support arms being telescopingly received in channels located on opposite sides of the article. The forward bracket preferably includes two L-shaped bracket arms connected to the forward sidewalls of the distiller and has ends telescopingly receiving a cross member that supports the bottom of the front of said article. The cross member can be provided with upwardly extending positioning pins that are received in apertures in the bottom surface of the distiller or similar article.

The rear mounting bracket may comprise a U-shaped member mounted on and extending forwardly from the rear wall of the space. The sides of the U-shaped member are vertically oriented and are provided with a plurality of slots positioned at different vertical displacements. Each of the slots comprises a plurality of notches along the bottom of the slot to support and retain the horizontal member. In an alternative embodiment the bracket may be provided with either a single pair of slots or an indentation at the top of each flange of the U-shaped bracket. In this embodiment vertical adjustment can be provided for by means of holes at different vertical displacements which allow for vertical adjustment of the horizontal member.

DRAWINGS

The invention will be set forth in greater detail in the following detailed description and accompanying drawings wherein:

FIG. 1 is a perspective view of a mounting system of the present invention and article to be mounted shown with the parts disassembled but oriented with respect to each other;

FIG. 2 is a side view of an article mounted in accordance with the present invention with parts broken away;

FIG. 3 is a fragmentary cross-sectional view taken along line 3—3 of FIG. 2;

DETAILED DESCRIPTION

Figure 4:
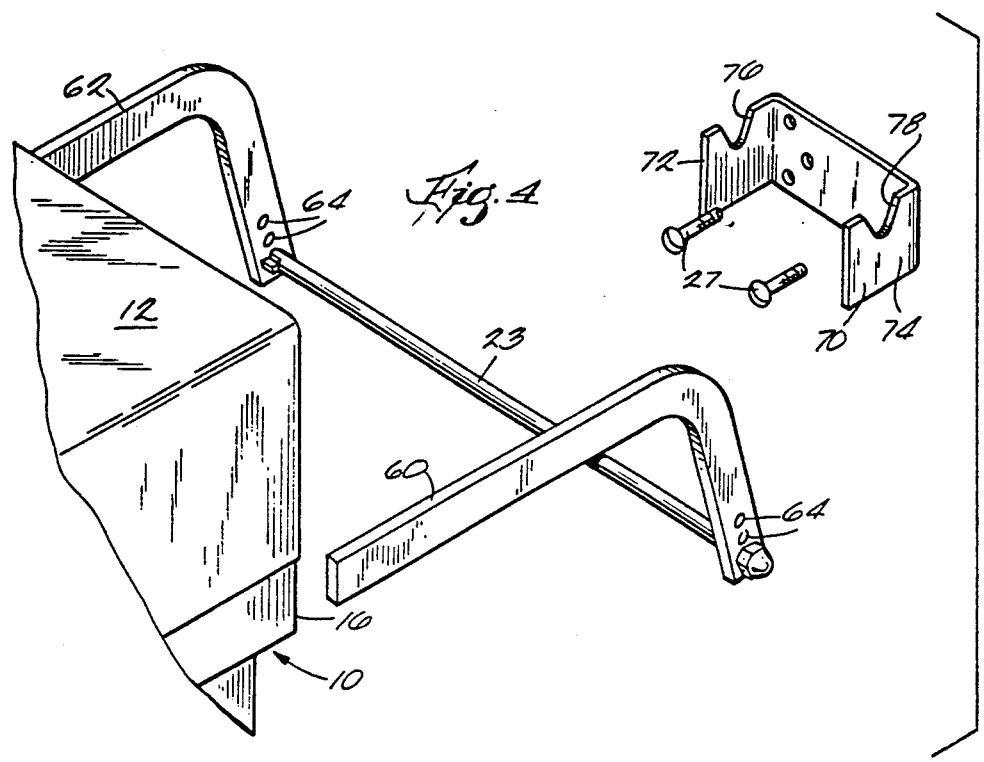
FIG. 4 is a fragmentary perspective view of an alternative embodiment of the invention.

Referring to the drawings there is seen an article 10 such as a horizontally oriented low profile water distillation unit adapted to be mounted in a space such as in a kitchen under-counter drawer or similar cabinet space. Article 10 in this case includes a body portion 12 and a front portion 14 of a narrower profile adapted to extend through the front of a cabinet. Front surface 15 may be provided with various control buttons, knobs or indicator lights as required.

A horizontal channel 16 is provided in the body of article 10, preferably at each side thereof. Channels 16 are adapted to telescopingly receive arms 20 and 22 so that the article can be supported in cabinets or spaces of varying depths. A cross bar 23 connects the distal ends of arms 20 and 22. As shown in the drawings, arms 20 and 22 are preferably downwardly angled at their distal ends. Such an angled configuration makes the distal ends and horizontal cross bar 23 more readily visible thereby facilitating installation of the article 10 in a space.

A mounting bracket 24 is provided in order to support cross arm 23 at the rear of the cabinet or similar mounting space. Bracket 24 is adapted to be attached to the rear cabinet wall 26 by means of wood screws 27 or the like. As will be noted, bracket 24 is of a U-shaped configuration and the opposed and aligned legs of the U are provided with a plurality of slots 30. Preferably slots 30 are forwardly and upwardly angled as indicated and each contains a plurality of notches 31 along the bottom surface of the slots in order to receive and support horizontal cross member 23 at a suitable vertical displacement so that article 10 is affixed in a level orientation within the cabinet.

A front panel 36 is provided with a central opening to receive a front portion 14 of article 10. Front panel 36 may, if desired, simply be the front panel of a drawer that has been removed from the cabinet in which article 10 is being installed. Otherwise a panel matching the appearance of the front wall of the mounting space is provided.

It will be noted that the hardware for mounting the front portion of article 10 includes a cross member 38 which may be in the form of a bar of square cross-section. Ninety degree angled brackets 40 adapted to be mounted to the edges of the opening in the cabinet front are provided to support opposite ends of bar 38. A convenient method for securing bar 38 on the brackets includes the use of O-rings 42 which will frictionally retain bar 38 in correct position and also tend to dampen any vibration occurring during the operation of article 10. Upwardly extending locating pins 44 are preferably provided on the upper surface of cross bar 38. Locating pins 44 are adapted to extend into apertures 45 provided in the lower surface of the front portion 14 of article 10. A trim component 48 can be provided as desired in order to conceal any irregularities in the opening 37 in front panel 36.

While article 10 is illustrated to be a distillation unit, the system can be utilized for mounting other articles in a similar space. For example, article 10 could be an electronic component, such as a radio, or another appliance such as a compact ice maker unit or cabinet mounted microwave oven or the like. In such cases the dimensions of front panel 38 would be appropriately enlarged or adjusted.

Figure 5:
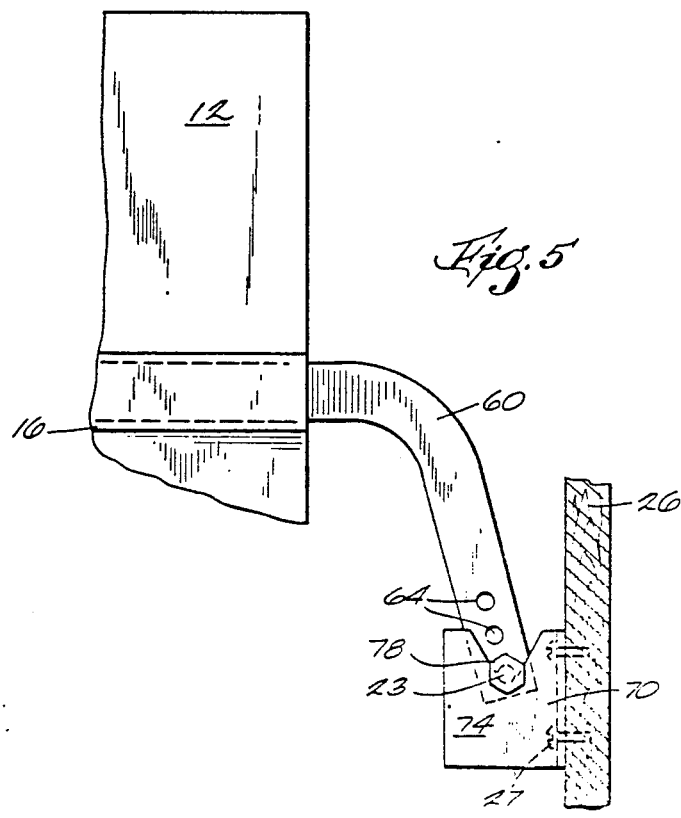
FIG. 5 is a fragmentary side view of the embodiment of FIG. 4 mounted on a rear wall.

In the embodiment shown in FIGS. 4 and 5 alternate telescoping support arms 60 and 62 are provided. Each of arms 60 and 62 is provided with a series of holes 64 which can be used to support horizontal cross member 23 at a variety of different vertical displacements. In this embodiment the vertical adjustment of the rear of distiller 10 is provided for by the use of different pairs of holes 64 to support member 23.

This arrangement allows for the use of a simplified rear bracket 70. Bracket 70 as best seen in FIG. 4 is also of a U-shaped configuration having flanges 72 and 74. Flanges 72 and 74 have indentations 76 and 78, respectively, to receive and support horizontal member 23 as seen in FIG. 5. It will be noted that while vertical adjustment of the device is not quite as simple with this embodiment, the manufacturing cost of the components, particularly rear bracket 70 is significantly reduced.

While preferred embodiments of the invention have been shown for purposes of illustration, it will be readily apparent to those skilled in the art that various modifications can be made without departing from the spirit of the invention or scope of the accompanying claims.

What is claimed is:

1. An adjustable mounting system for mounting an article in a space comprising front and rear walls comprising:
   a support arm received in telescoping relationship in a channel located on said article and having a horizontal member affixed to the distal end thereof,
   said article comprising forward and rear ends and a horizontal channel oriented in a front to rear direction adapted to telescopingly receive said arm,
   a rear mounting bracket having means for receiving and supporting said horizontal member, said bracket and said means being provided with means to adjust the vertical displacement of said support arm,
   a forward bracket adapted to adjustably support the forward end of said article on the forward wall of said space, said forward wall having an opening for access to the front of said article.

2. A system according to claim 1 wherein a support arm is affixed to each end of said horizontal member, each of said support arms being telescopingly received in channels located on opposite sides of the article.

3. A system according to claim 2 wherein the horizontal member is affixed to a downwardly angled rear portion of said support arms and connects the rearward ends of said angled portions.

4. A system according to claim 3 wherein said angled portions of said support arms are provided with means to selectively support said horizontal member in any one of a plurality of vertical displacements.

5. A system according to claim 1 wherein said forward bracket comprises two L-shaped bracket arms connected to the forward sidewalls of said article, said bracket arms having ends telescopingly receiving a cross member that supports the bottom of the front of said article.

6. A system according to claim 5 wherein said cross member is provided with upwardly extending pins that are received in apertures in the bottom surface of said articles.

7. A system according to claim 1 where said rear mounting bracket comprises a U-shaped member extending forwardly from the rear wall, the sides of said U-shaped members being vertically oriented and comprising a plurality of slots at positioned at different vertical displacements, each of said slots comprising a plurality of notches along the bottom of said slot to support and retain said horizontal member.

8. A system according to claim 1 wherein said article is a low profile, horizontally disposed water distiller and said space comprises part of a kitchen cabinet.

9. An adjustable mounting system for mounting a low profile water distillation unit in a kitchen cabinet comprising:
   a support arm received in telescoping relationship in a channel located on each side of the distillation unit,
   a horizontal cross member affixed to the distal ends of said arms,
   a rear mounting bracket having a plurality of vertically displaced slots for receiving and supporting said horizontal cross member,
   said distillation unit comprising a horizontal channel oriented in a front to rear direction adapted to telescopingly receive said arms,
   a forward bracket adapted to adjustably support the forward end of said article on the forward wall of said cabinet.

10. A system according to claim 9 wherein said forward bracket comprises two L-shaped bracket arms connected to the forward sidewalls of said article, said bracket arms having ends telescopingly receiving a cross member that supports the bottom of the front of said article, wherein said cross member is provided with upwardly extending pins that are received in apertures in the bottom surface of said distillation units.

11. An adjustable mounting system for mounting an article in a space comprising front and rear walls comprising:
   a support arm received in telescoping relationship in a channel located on said article and having a horizontal member affixed to the distal end thereof, said support arm being provided with means to support said horizontal arm selectively in any one of a plurality of vertical displacements on said arm, a rear mounting bracket having means for receiving and supporting said horizontal member, said article comprising forward and rear ends and a horizontal channel oriented in a front to rear direction adapted to telescopingly receive said arm, a forward bracket adapted to adjustably support the forward end of said article on the forward wall of said space, said forward wall having an opening for access to the front of said article.

* * * * *